United States Patent
Balasubramanian et al.

(10) Patent No.: US 12,547,597 B2
(45) Date of Patent: Feb. 10, 2026

(54) INFERRING GRAPH MODEL FROM SEMANTIC MODEL

(71) Applicant: Microsoft Technology Licensing, LLC, Redmond, WA (US)

(72) Inventors: Santosh Balasubramanian, Seattle, WA (US); Yuanyuan Tian, San Jose, CA (US); Juan Andres Colmenares Diaz, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 18/658,751

(22) Filed: May 8, 2024

(65) Prior Publication Data

US 2025/0348474 A1    Nov. 13, 2025

(51) Int. Cl.
*G06F 16/22* (2019.01)
*G06F 16/21* (2019.01)

(52) U.S. Cl.
CPC .......... *G06F 16/221* (2019.01); *G06F 16/211* (2019.01)

(58) Field of Classification Search
CPC .............................. G06F 16/221; G06F 16/211
See application file for complete search history.

(56) References Cited

U.S. PATENT DOCUMENTS

| | | | |
|---|---|---|---|
| 9,280,581 B1 * | 3/2016 | Grimes | G06F 17/18 |
| 10,628,421 B2 | 4/2020 | Devarao | |
| 10,901,973 B1 * | 1/2021 | Senra | G06F 16/258 |
| 11,216,455 B2 | 1/2022 | Tong | |
| 11,656,868 B1 | 5/2023 | Gottlob et al. | |
| 2004/0204838 A1 | 10/2004 | Chen et al. | |
| 2008/0168071 A1 | 7/2008 | Dykes et al. | |
| 2010/0031162 A1 | 2/2010 | Wiser et al. | |
| 2010/0031165 A1 | 2/2010 | Lindquist | |
| 2016/0071233 A1 | 3/2016 | Macko et al. | |

(Continued)

FOREIGN PATENT DOCUMENTS

| | | |
|---|---|---|
| WO | 2009149262 A1 | 12/2009 |
| WO | 2024157776 A1 | 8/2024 |

OTHER PUBLICATIONS

Non-Final Office Action mailed on Feb. 27, 2025, in U.S. Appl. No. 18/679,250, 17 Pages.

(Continued)

*Primary Examiner* — William P Bartlett
(74) *Attorney, Agent, or Firm* — ArentFox Schiff LLP (57) ABSTRACT

Apparatuses, methods, and computer-readable media infer a graph model from a semantic model that describes source tables and relationships among the source tables. The apparatus identifies at least one primary key for each relationship of a plurality of relationships defined in the semantic model based on whether the relationship is a m:1 relationship or a 1:1 relationship, each relationship defining at least one from-table and one to-table. The apparatus creates a vertex table in the graph model for each source table having a primary key. The apparatus creates an edge table in the graph model for each from-table defined in a m:1 relationship of the semantic model and creates an edge table in the graph model for one of the from-table or the to-table in a 1:1 relationship of the semantic model. Each edge of the edge table is labeled with a source or destination vertex table and a foreign-key.

21 Claims, 7 Drawing Sheets

(56) References Cited

U.S. PATENT DOCUMENTS

| | | |
|---|---|---|
| 2016/0342708 A1 | 11/2016 | Fokoue-Nkoutche |
| 2017/0068748 A1 | 3/2017 | Hu et al. |
| 2017/0193016 A1 | 7/2017 | Kulkarni |
| 2017/0364534 A1 | 12/2017 | Zhang |
| 2018/0011945 A1* | 1/2018 | Vaquero Gonzalez ............... G06F 16/248 |
| 2018/0039710 A1 | 2/2018 | Chen et al. |
| 2018/0225314 A1 | 8/2018 | Devarao |
| 2019/0121810 A1 | 4/2019 | Zhuang |
| 2019/0171655 A1 | 6/2019 | Psota et al. |
| 2020/0201909 A1* | 6/2020 | Das .................. G06F 16/25 |
| 2021/0056104 A1 | 2/2021 | Tong et al. |
| 2021/0253063 A1 | 8/2021 | Pupillo et al. |
| 2021/0256053 A1 | 8/2021 | Soppin et al. |
| 2021/0256063 A1 | 8/2021 | Kasperovics et al. |
| 2022/0138262 A1 | 5/2022 | Yan et al. |
| 2022/0245147 A1 | 8/2022 | Segalini et al. |
| 2023/0175856 A1 | 6/2023 | Khoe |
| 2023/0176856 A1 | 6/2023 | Khare et al. |
| 2023/0267120 A1 | 8/2023 | Hugo |

OTHER PUBLICATIONS

Non-Final Office Action mailed on May 20, 2025, in U.S. Appl. No. 18/744,242, 12 pages.

Extended European search report received for European Application No. 25174447.0, mailed on Aug. 18, 2025, 9 Pages.

Extended European search report received in European Application No. 25176679.6, mailed on Jul. 30, 2025, 12 pages.

Final Office Action mailed on Aug. 11, 2025, in U.S. Appl. No. 18/679,250, 19 pages.

Koutras, et al., "OmniMatch: Effective Self-Supervised Any-Join Discovery in Tabular Data Repositories", Retrieved from: https://arxiv.org/abs/2403.07653, Mar. 12, 2024, 14 Pages.

Non-final office action mailed on Jun. 4, 2025, in U.S. Appl. No. 18/658,800, 32 pages.

* cited by examiner

INFERRING GRAPH MODEL FROM SEMANTIC MODEL

BACKGROUND

Graph models offer a powerful tool for data analysis by allowing queries that explore the relationships among data elements. Conventional approaches to using graph models involve constructing a graph database by performing extract, transform, and load (ETL) processes to make a copy of the source data. Such processes are resource intensive in terms of both computing resources to store the copied source data and human resources for designing the graph database. Further, ETL processes result in multiple copies of the data that need to be managed for accuracy, privacy, and security.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In some aspects, the techniques described herein relate to an apparatus for inferring a graph model from a semantic model that describes source tables and relationships among the source tables, including: one or more memories; and one or more processors coupled with the memory and, individually or in combination, configured to identify at least one primary key for each relationship of a plurality of relationships defined in the semantic model based on whether the relationship is a m:1 relationship or a 1:1 relationship, each relationship defining at least one from-table and one to-table; create a vertex table in the graph model for each source table having a primary key, each vertex of the vertex table labeled with a name of a respective source table; create an edge table in the graph model for each from-table defined in a m:1 relationship of the semantic model; create an edge table in the graph model for one of the from-table or the to-table in a 1:1 relationship of the semantic model, each edge of the edge table is labeled with one or both of a source vertex table or a destination vertex table and a foreign-key column name that relates the source vertex table and the destination vertex table.

In some aspects, the techniques described herein relate to a method of inferring a graph model from a semantic model that describes source tables and relationships among the source tables, the method including: identifying at least one primary key for each relationship of a plurality of relationships defined in the semantic model based on whether the relationship is a m:1 relationship or a 1:1 relationship, each relationship defining at least one from-table and one to-table; creating a vertex table in the graph model for each source table having a primary key, each vertex of the vertex table labeled with a name of a respective source table; creating an edge table in the graph model for each from-table defined in a m:1 relationship of the semantic model; creating an edge table in the graph model for one of the from-table or the to-table in a 1:1 relationship of the semantic model, each edge of the edge table is labeled with one or both of a source vertex table or a destination vertex table and a foreign-key column name that relates the source vertex table and the destination vertex table.

In some aspects, the techniques described herein relate to a non-transitory computer-readable medium having computer-executable instructions stored thereon for inferring a graph model from a semantic model that describes source tables and relationships among the source tables, the instructions when executed by a computer processor cause the computer processor to: identify at least one primary key for each relationship of a plurality of relationships defined in the semantic model based on whether the relationship is a m:1 relationship or a 1:1 relationship, each relationship defining at least one from-table and one to-table; create a vertex table in the graph model for each source table having a primary key, each vertex of the vertex table labeled with a name of a respective source table; create an edge table in the graph model for each from-table defined in a m:1 relationship of the semantic model; create an edge table in the graph model for one of the from-table or the to-table in a 1:1 relationship of the semantic model, each edge of the edge table is labeled with one or both of a source vertex table or a destination vertex table and a foreign-key column name that relates the source vertex table and the destination vertex table.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known components are shown in block diagram form in order to avoid obscuring such concepts.

This disclosure describes various examples related to generation of graph models based on underlying data stored in a data lake. In particular, the techniques described herein infer a graph model based on a semantic model describing relationships among data in the data lake. For example, a common semantic model is a Business Intelligence (BI) semantic model. A BI semantic model is a logical representation of the data sources, relationships, calculations, and measures that are used to create reports and dashboards. Organizations often create a BI semantic model for reporting and visualizing data. For example, a BI model may be used to provide row level security and access control to present different views of the data to various users. Inferring a graph model from a BI semantic model may add additional analysis and query capabilities based on the underlying data described by the BI semantic model. For example, a graph model may facilitate graph traversal queries, running graph algorithms, knowledge graph search, etc.

In an aspect, the graph model is built over existing data in a data lake. The graph model describes relationships among underlying source tables and includes pointers to locations of the data in the data lake, but does not require copying all data from the underlying source tables into a separate graph database. In an example, the graph model may be a property graph model, which is a directed graph where each vertex and each edge can have an arbitrary number of properties. Vertices may also be referred to as nodes and edges may be referred to as relationships. Vertices and edges in a property graph model are also tagged with labels to distinguish the different types of nodes and relationships in the graph. For instance, a node type in the graph model may represent a type of business entity that corresponds to a source table. Rows within the source table become node instances when the source table is mapped to the graph model.

Inferring a graph model from a semantic model may include mapping the vertex set and the edge set of the property graph to the tables in the data sources. In the semantic model, a relationship can either be a 1:1 relationship or a m:1 relationship. And for each relationship, the semantic model also defines the from-table and from-column, as well as the to-table and to-column, which means the from-column of the from-table references the to-column of the to-table. In an aspect, the vertex tables and edge tables of the graph model may be selected based on primary keys identified according to the type of relationship. Source tables with a primary key can be represented as a vertex table labeled with the primary key as the unique identifier. Each column in the vertex table, except the ones that are primary keys or foreign keys, is a property of the corresponding vertex. Edge tables can be created for source tables in a relationship with a vertex table. All edges in an edge table are labeled with the source and destination vertex table names and the foreign-key column name that relates them. Measures in the semantic model can be defined as computed properties for each vertex in the vertex table.

Implementations of the present disclosure may realize one or more of the following technical effects. The creation of a graph model automatically using relationship information in a semantic model improves the speed of creation of graph models and allows graph models to be quickly deployed to answer questions. Further, the graph model can be generated on-the-fly and only when needed, which reduces storage resources compared to importing data into a graph database. Additionally, the graph model is built over underlying data in the data lake without ETL. This structure provides the functionality and performance of graph queries and algorithms without the cost of resources for copying and storing copied data. This structure also reduces the burden of data management of multiple copies of data.

Figure 4:
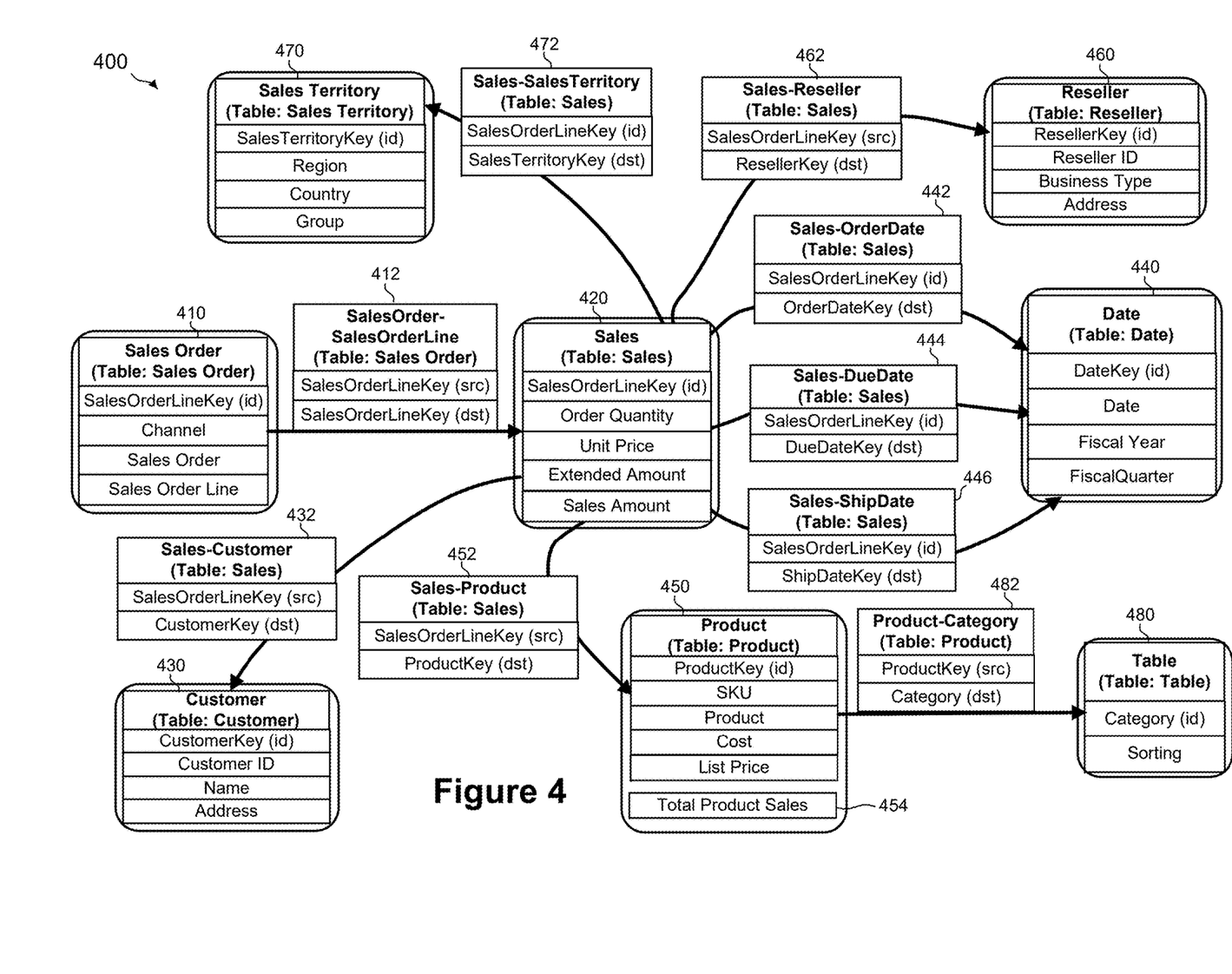
FIG. 4 is a diagram of an example graph model corresponding to the example tables and relationships of FIG. 3, in accordance with aspects described herein.
Figure 5:
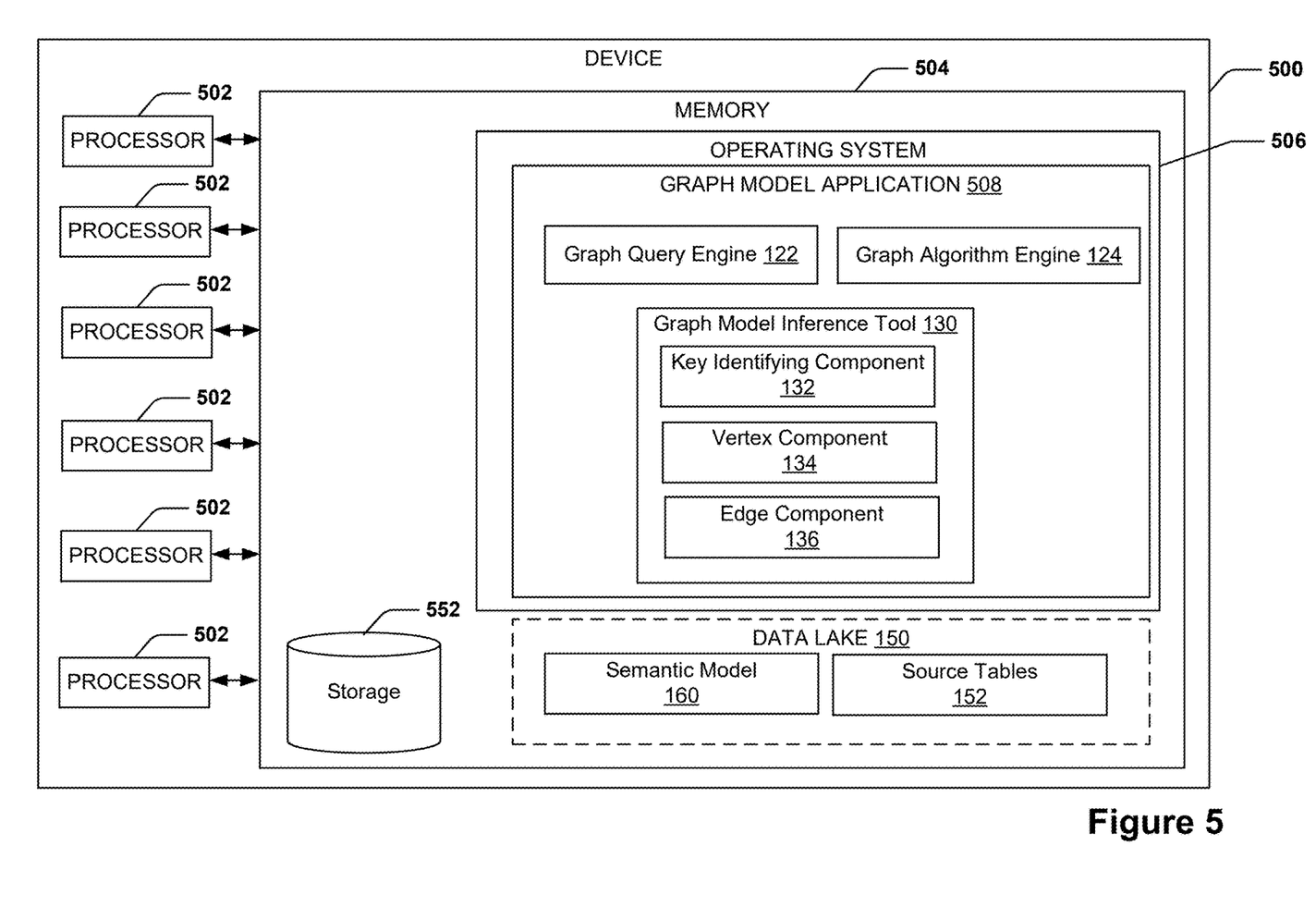
FIG. 5 is a schematic diagram of an example of an apparatus (e.g., a computing device) for inferring a graph model from a semantic model that describes source tables and relationships among the source tables.
Figure 6:
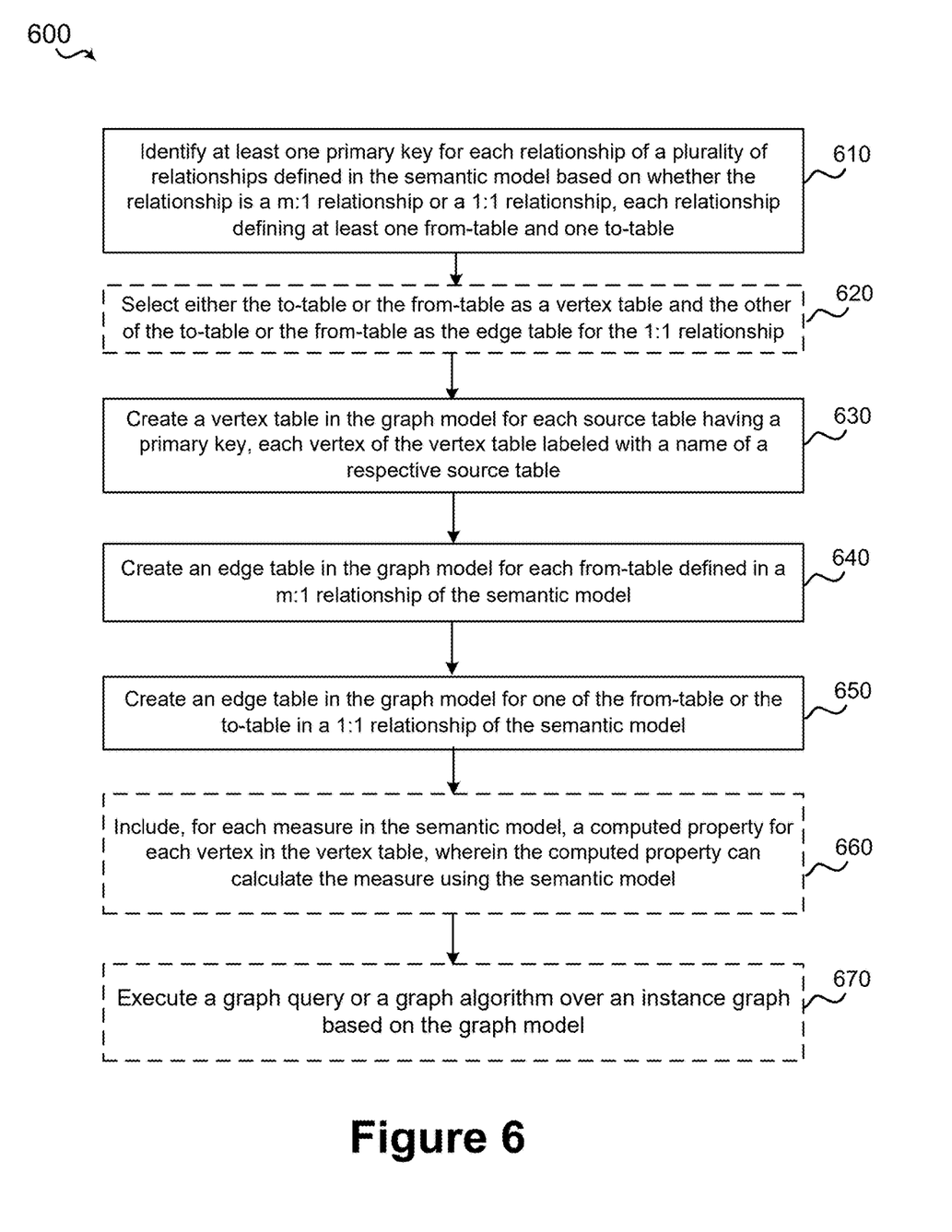
FIG. 6 is a flow diagram of an example of a method for inferring a graph model from a semantic model that describes source tables and relationships among the source tables.

Turning now to FIGS. 1-7, examples are depicted with reference to one or more components and one or more methods that may perform the actions or operations described herein, where components and/or actions/operations in dashed line may be optional. Although the operations described below in FIG. 6 are presented in a particular order and/or as being performed by an example component, the ordering of the actions and the components performing the actions may be varied, in some examples, depending on the implementation. Moreover, in some examples, one or more of the actions, functions, and/or described components may be performed by a specially-programmed processor, a processor executing specially-programmed software or computer-readable media, or by any other combination of a hardware component and/or a software component capable of performing the described actions or functions.

Figure 1:
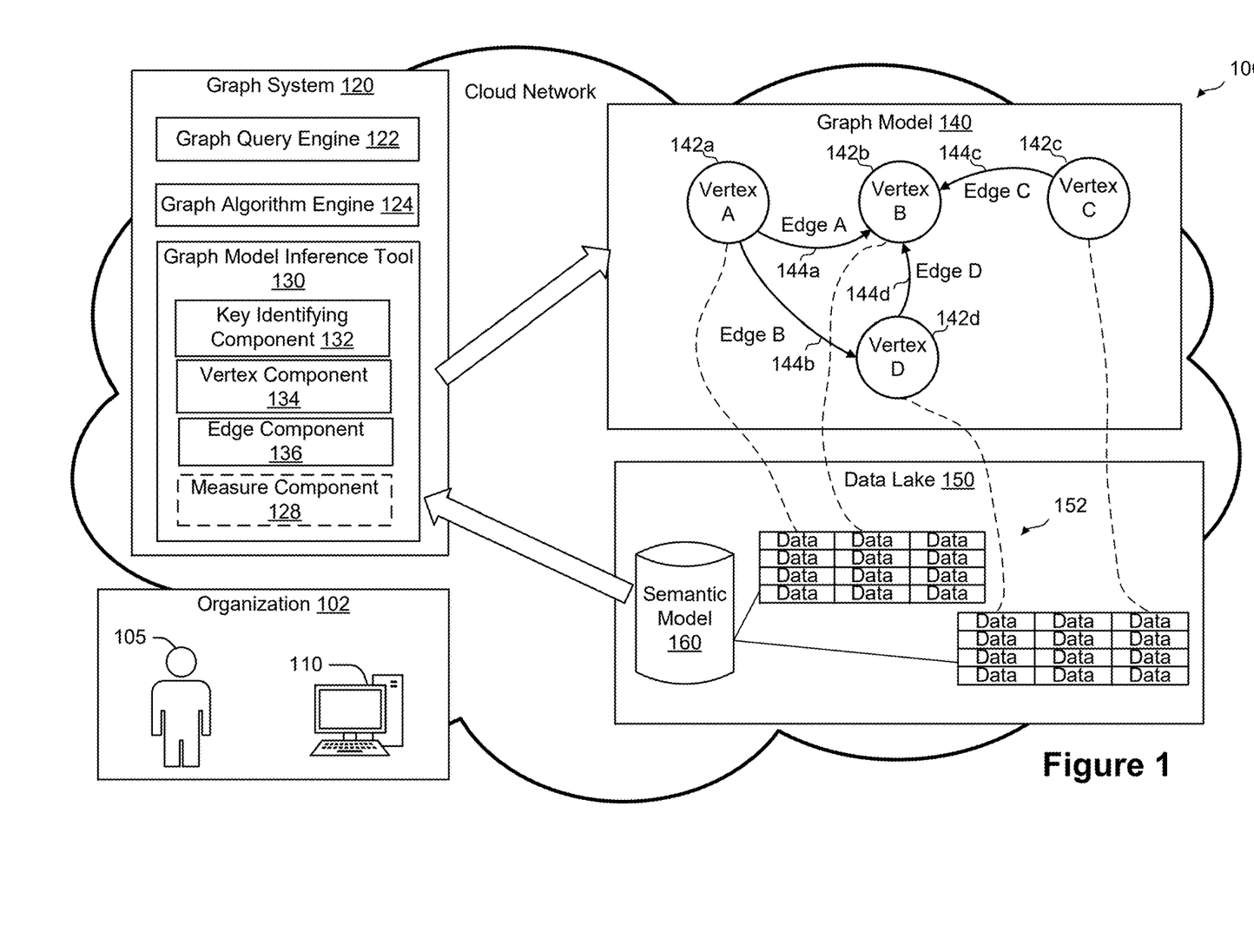
FIG. 1 is a conceptual diagram of an example of an architecture for a graph system to automatically infer a graph model based on a semantic model, in accordance with aspects described herein.

FIG. 1 is a conceptual diagram 100 of an example of an architecture for a graph system 120 to automatically infer a graph model 140 based on a semantic model 160. The graph system 120 may be, for example, a cloud network including computing resources that are controlled by a network operator and provide services accessible to public clients such as an organization 102 represented by a user device 110 operated by a user 105. For example, the system 120 may include a plurality of datacenters that include computing resources such as computer memory and processors. In some implementations, the datacenters host a data management service that provides computing nodes and storage on computing resources located in the datacenter. The computing nodes may be containerized execution environments with allocated computing resources. For example, the computing nodes may be virtual machines (VMs), process-isolated containers, or kernel-isolated containers. The nodes may be instantiated at a datacenter and imaged with software (e.g., operating system and applications for a service). The system 120 may include edge routers that connect the datacenters to external networks such as internet service providers (ISPs) or other autonomous systems (ASes) that form the Internet.

The graph system 120 includes a data lake 150 that stores a plurality of source tables 152. The source tables 152 may include various updatable column-oriented table formats for storing tabular data such as SQL or noSQL databases, comma separated value (CSV) files, and Parquet based formats such as delta tables. For example, the source tables 152 may include data that is imported or created by the organization 102. For instance, the source tables 152 may include, for example, operational data for a business, scientific records, medical records, government records, or any other collection of data. A semantic model 160 is associated with the source tables 152. The semantic model 160 describes relationships among the source tables 152. For example, the semantic model 160 may be built to facilitate reporting and visualization of the data in data lake 150.

The graph system 120 includes a graph model inference tool 130 configured to generate a graph model 140 over the source tables 152 in the data lake 150 based on the semantic model 160 that describes the source tables 152 and relationships among the source tables. The graph system 120 may include a key identifying component 132, a vertex component 134, and an edge component 136. The graph system 120 may optionally include a measure component 138. The key identifying component 132 is configured to identify at least one primary key for each relationship of a plurality of relationships defined in the semantic model based on whether the relationship is a m:1 relationship or a 1:1 relationship. Each relationship defines at least one from-table and one to-table. The vertex component 134 is configured to create a vertex table in the graph model for each source table having a primary key. Each vertex of the vertex table is labeled with a name of a respective source table. The edge component 136 is configured to create an edge table in the graph model for each from-table defined in a m:1 relationship of the semantic model and create an edge table in the graph model for one of the from-table or the to-table in a 1:1 relationship of the semantic model. Each edge of the edge table is labeled with a combination of a source vertex table, a destination vertex table, and a foreign-key column name that relates the source vertex table and the destination vertex table. The optional measure component 138 may be configured to include a computed property for each vertex in the vertex table. The computed property can calculate the measure using the semantic model.

In some implementations, the graph system 120 includes a graph query engine 122 and/or a graph algorithm engine 124. The graph model 140 describes a property graph for the source tables 152. The graph query engine 122 and/or a graph algorithm engine 124 can operate on a graph index over the source tables 152 based on the graph model 140. The index references the vertex tables and edge tables using numerical identifiers. Accordingly, data may remain in the source tables 152 without ETL into a separate graph database. The graph query engine 122 can perform graph queries on the graph index, then the query results can be looked up based on the index if needed. Similarly, the graph algorithm engine 124 can perform graph algorithms on the index. Updates to data can be pushed from the index back to the source tables.

Figure 2:
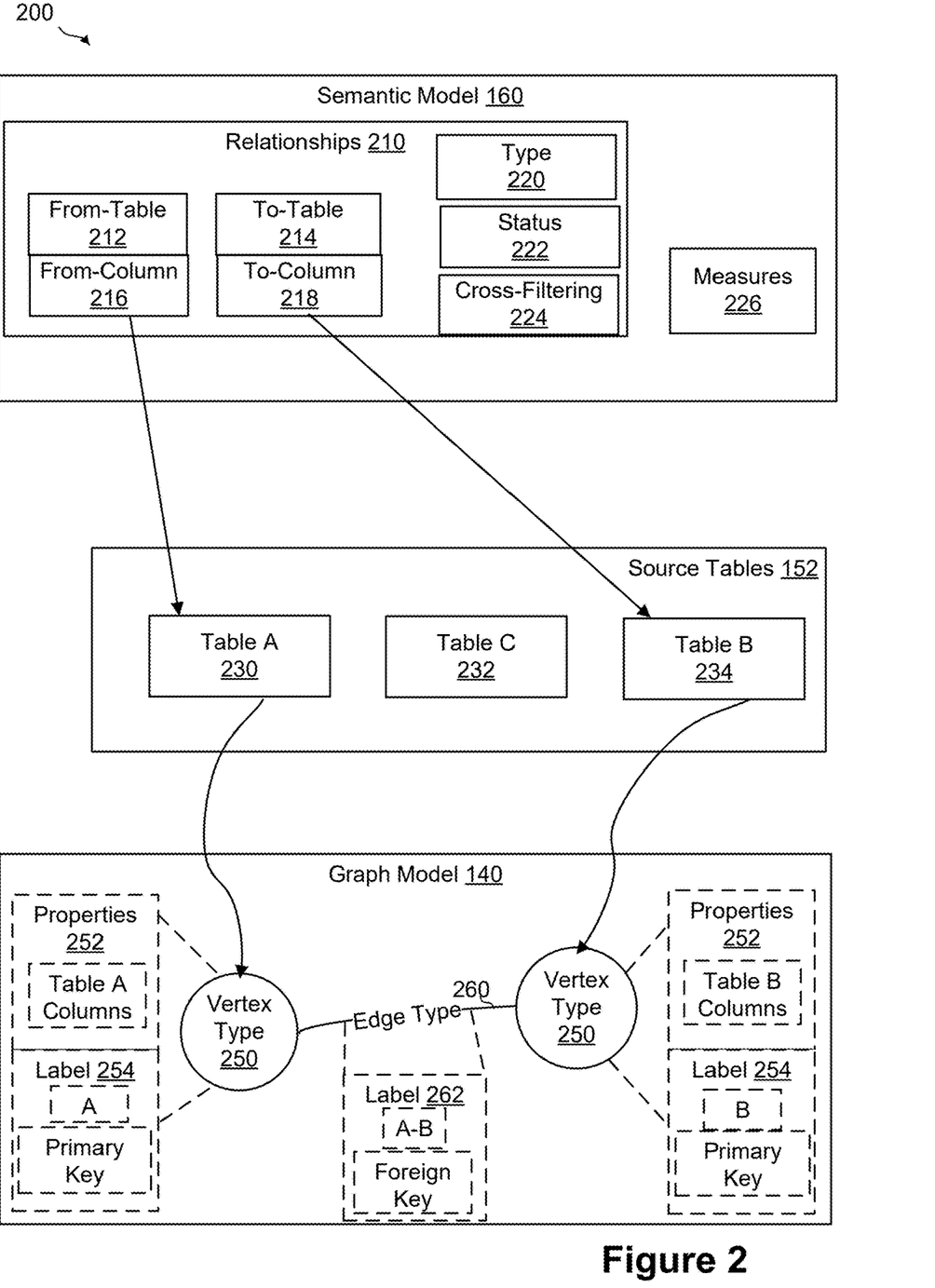
FIG. 2 is a conceptual diagram of a graph model inferred from a semantic model, in accordance with aspects described herein.

FIG. 2 is a conceptual diagram 200 of a graph model 140 inferred from a semantic model 160. The semantic model 160 may be, for example, a BI semantic model. The graph model 140 may be a property graph.

The semantic model 160 describes source tables 152 and relationships 210 among the source tables. For example, the relationships 210 may define a from-table 212, a to-table 214, a from-column 216, and a to-column 218. The relationships 210 may also include a relationship type 220 (e.g., 1:1 or m:1), a status 222 (e.g., active or inactive), and a cross-filtering indication 224 of whether the relationship is unidirectional or bidirectional. The combination of the from-table 212 and from-column 216 point to a column of a source table 152 such as table 230. The combination of the to-table 214 and the to-column 218 point to a column of a source table 152 such as table 234. The relationship 210 indicates that the from-column 216 of the from-table 212 references the to-column 218 of the to-table 214.

The graph model inference tool 130 can use the information about relationships 210 to generate the graph model 140. For example, the key identifying component 132 can identify primary keys based on the type 220 of the relationships. For an m:1 relationship, the to-column 218 can serve as a primary key of the to-table 214. Each from-column 216 of the from-tables 212 is a foreign key to the to-column 218 of the to-table 214. For a 1:1 relationship, the to-column 218 can be a primary key of the to-table 214 and the from-column 216 can be a primary key of the from-table 212. The foreign key relationships for a 1:1 relationship are bidirectional.

Once the primary keys are identified, the primary keys can be represented as vertices in the graph model 140. That is, a source table 152 with a primary key can be a vertex type 250 in the graph model 140. The vertex type 250 may be represented as a vertex table, where each row of the vertex table is a vertex in the graph. The primary key serves as a unique id column of the vertex table for the vertex type 250. The vertex type 250 includes a label 254 that indicates the name of the source table 152 having the primary key. The vertex type 250 also includes properties 252 corresponding to the columns of the source table 152 that are not used as keys.

An edge type 260 can be created for each from-table 212 in an m:1 relationship. For 1:1 relationships, either the from-table 212 or the to-table 214 can become an edge type. For instance, if the from-table 212 of a 1:1 relationship is selected as a vertex type, the to-table 214 may be selected as an edge type. In cases where both the from-table 212 and the to-table 214 are selected as vertex types, one of the tables may also be selected as an edge type 260. The edge types 260 include a label 262 with a combination of the source and destination vertex type names and the foreign key column that relates the tables.

The inference of vertex types and edge types from the relationships 210 can be performed for each relationship 210. The final graph model 140 may include a vertex type 250 corresponding to each source table 152 and an edge type for each from-column 216 in a relationship 210.

Figure 3:
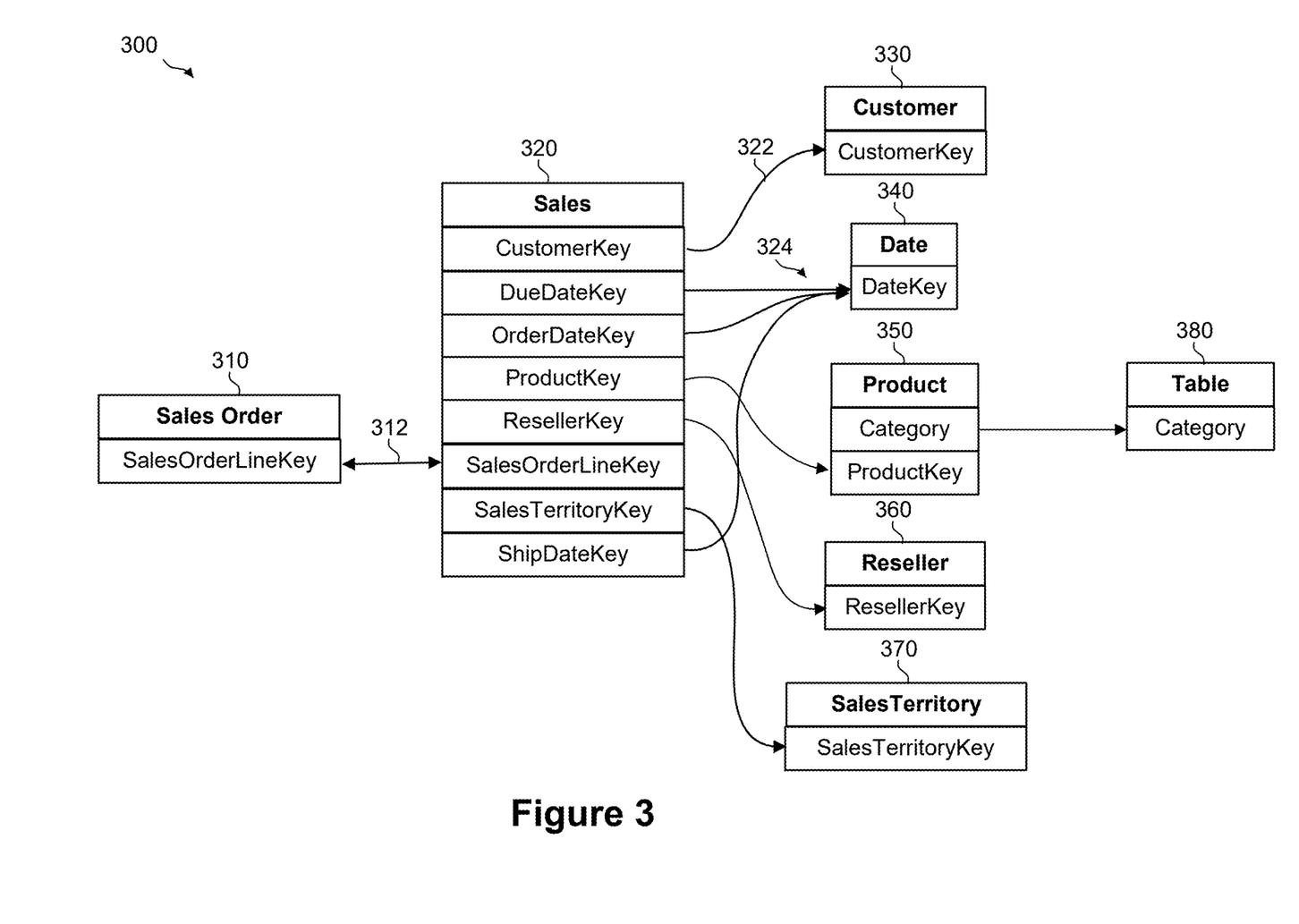
FIG. 3 is a diagram of example relationships among tables as described by a semantic model.

FIG. 3 is a diagram of example relationships among tables as described by a semantic model. The source tables are represented with bolded table names, and the columns of the tables that are associated with a relationship are indicated below the table names with an arrow to the related column of another table. For example, the illustrated tables include a sales order table 310, a sales table 320, a customer table 330, a date table 340, a product table 350, a reseller table 360, a sales territory table 370, and a table 380.

In the illustrated example, 1:1 relationships are depicted as bidirectional, and m:1 relationships are depicted one-direction A first example relationship 312 is a 1:1 relationship between the SalesOrderLineKey column of the sales order table 310 and the SalesOrderLineKey column of sales table 320. A second example relationship 322 is a m:1 relationship between a CustomerKey column of sales table 320 and a CustomerKey column of customer table 330. There may be multiple relationships 324 involving table. For example, there is a first m:1 relationship between the DueDateKey column of the sales table 320 and the DateKey column of the date table 340, a second m:1 relationship between the OrderDateKey column of the sales table 320 and the DateKey column of the date table 340, and a third m:1 relationship between the ShipDateKey column of the sales table 320 and the DateKey column of the date table 340.

FIG. 4 is a diagram of an example graph model 400 corresponding to the example tables and relationships of FIG. 3. The example graph model 400 includes a plurality vertex types including a sales order vertex type 410, a sales vertex type 420, a customer vertex type 430, a date vertex type 440, a product vertex type 450, a reseller vertex type 460, a sales territory vertex type 470, and a table vertex type 480. Each vertex type includes a name of the vertex type, which may be derived from a name of a source table. Each vertex type also includes a unique id, which may be the primary key identified for the table.

For example, based on the first example relationship 312 being a 1:1 relationship, the SalesOrderLineKey column of sales order table 310 can be identified as a primary key of the sales order vertex type 410, and the SalesOrderLineKey column of sales table 320 can be identified as a primary key of the sales vertex type 420. Further an edge type 420 may be based on the sales order table 310 and labeled with a combination of the name of the sales order table (from table) and the foreign key column names for the source vertex table (i.e., sales order vertex type 410) and the destination vertex table (i.e., sales vertex type 420). In some implementations, different rules may specify the combination of table and column names to label.

As another example, based on the second example relationship 322 being a m:1 relationship, the CustomerKey column of customer table 330 (to-table) can be identified as a primary key of the customer vertex type 430. In this case, because there is already a primary key (SalesOrderLineKey) for the sales vertex type 420, the primary key of that table may be a foreign key of the sales-customer edge type 432. The sales-customer edge type 432 may also be labeled with the primary key of the customer vertex type 430 (CustomerKey) as another foreign key.

In the case of the m:1 relationships 324, the to-column of the to-table (e.g., DateKey column of date table 340) can be the primary key of the date vertex type 440. Then, an edge type is created for each relationship based on the respective from-column of the from-table and labeled with the from-table (e.g., sales table 320) and from-column: Sales-OrderDate edge type 442, Sales-DueDate edge type 444, and Sales-ShipDate edge type 446.

The other relationships of FIG. 3 can be similarly used to infer vertex types and edge types based on the type 220 of the relationships. Additionally, the vertex types may include properties based on column names of columns of the corresponding source tables that are not associated with a relationship. For example, the sales order vertex type 410 may include a property with the "channel" column name. Although the channel column name is not directly related to another table, the graph model 400 allows graph queries and graph algorithms based on the connections of the channel column name (or data stored therein in source tables) with other vertices. In some implementations, because the edge types are associated with vertex types including such properties, the edge types can include an empty property set and only include the labels based on the table names and foreign keys.

FIG. 5 is a schematic diagram of an example of an apparatus 500 (e.g., a computing device) for inferring a graph model from a semantic model that describes source tables and relationships among the source tables. The apparatus 500 may be implemented as one or more computing devices in the system 120.

In an example, the apparatus 500 includes at least one processor 502 and a memory 504 configured to execute or store instructions or other parameters related to providing an operating system 506, which can execute one or more applications or processes, such as, but not limited to, a graph model application 508 that implements the graph model system 120. For example, processors 502 and memory 504 may be separate components communicatively coupled by a bus (e.g., on a motherboard or other portion of a computing device, on an integrated circuit, such as a system on a chip (SoC), etc.), components integrated within one another (e.g., a processor 502 can include the memory 504 as an on-board component), and/or the like. Memory 504 may store instructions, parameters, data structures, etc. for use/execution by one or more of the processor 502, individually or in combination, to perform functions described herein. In some implementations, the memory 504 includes storage 552 for use by the graph model application 508. The storage 552 may include the data lake 150 storing the source tables 152 and/or the semantic model 160.

In an example, the graph model application 508 includes the graph query engine 122, the graph algorithm engine 124, and/or the graph model inference tool 130. The graph model inference tool 130 includes the key identifying component 132, the vertex component 134, and the edge component 136 discussed above with respect to FIG. 1.

In some implementations, the apparatus 500 is implemented as a distributed processing system, for example, with multiple processors 502 and memories 504 distributed across physical systems such as servers, virtual machines, or datacenters. For example, one or more of the components of the graph model application 508 may be implemented as services executing at different datacenters. The services may communicate via an API.

FIG. 6 is a flow diagram of an example of a method 600 for inferring a graph model from a semantic model that describes source tables and relationships among the source tables. For example, the method 600 can be performed by the graph model inference tool 130, the apparatus 500 and/or one or more components thereof to infer a graph model 140 from a semantic model 160 that describes source tables 152 and relationships 210 among the source tables.

At block 610, the method 600 may optionally identifying at least one primary key for each relationship of a plurality of relationships defined in the semantic model based on whether the relationship is a m:1 relationship or a 1:1 relationship, each relationship defining at least one from-table and one to-table. For example, in an aspect, apparatus 500, processor 502, memory 504, and/or key identifying component 132 may be configured to or may comprise means for identifying at least one primary key for each relationship of a plurality of relationships defined in the semantic model based on whether the relationship is a m:1 relationship or a 1:1 relationship, each relationship defining at least one from-table and one to-table. For example, the key identifying component 132 may step through each relationship 210 of the semantic model 160 and identify a from-table 212, to-table 214, from-column 216, and to-column 218. When the type 220 of the relationship 210 is an m:1 relationship, the at least one primary key includes the to-column 218 of the to-table 214 that is referenced by the from-column(s) 216 of the at least one from-table 212. When the type 220 of the relationship 210 is a 1:1 relationship, the at least one primary key includes the to-column 218 of the to-table 214 or the from-column 216 of the from-table 212. For instance, the key identifying component 132 may identify the primary key in a table that is not yet associated with a primary key.

Referring to an alternative or additional aspect, at block 620, the method 600 may further include selecting either the to-table or the from-table as a vertex table and the other of the to-table or the from-table as the edge table for the 1:1 relationship. For example, in an aspect, apparatus 500, processor 502, memory 504, graph model inference tool 130, and/or key identifying component 132 may be configured to or may comprise means for selecting either the to-table 214 or the from-table 212 as a vertex type 250 and the other of the to-table or the from-table as the edge type 260 for the 1:1 relationship. For example, for the second example relationship between sales table 320 and customer table 330, the key identifying component 132 may select the customer table 330 (from-table) as the vertex type 430 and select the sales table 320 as the edge type 432.

At block 630, the method 600 includes creating a vertex table in the graph model for each source table having a primary key, each vertex of the vertex table labeled with a name of a respective source table. For example, in an aspect, apparatus 500, processor 502, memory 504, graph model inference tool 130, and/or vertex component 134 may be configured to or may comprise means for creating a vertex type 250 in the graph model 140 for each source table 152 having a primary key, each vertex of the vertex table labeled with a name of a respective source table. The vertex table may further include a property set based on columns of the source table that are not used as keys in a vertex table or edge table.

At block 640, the method 600 includes creating an edge table in the graph model for each from-table defined in a m:1 relationship of the semantic model. For example, in an aspect, apparatus 500, processor 502, memory 504, the graph model inference tool 130 and/or the edge component 136 may be configured to or may comprise means for creating an edge table in the graph model for each from-table defined in a m:1 relationship of the semantic model. For example, the edge component 136 may create the edge tables: Sales-OrderDate edge type 442, Sales-DueDate edge type 444, and Sales-ShipDate edge type 446.

At block 650, the method 600 includes creating an edge table in the graph model for one of the from-table or the to-table in a 1:1 relationship of the semantic model. For example, in an aspect, apparatus 500, processor 502, memory 504, the key identifying component 132 and/or the edge component 136 may be configured to or may comprise means for creating an edge table in the graph model for one of the from-table or the to-table in a 1:1 relationship of the semantic model. For example, the edge component 136 may create the sales-customer edge type 432 based on the 1:1 relationship between sales table 320 and customer table 330.

At block 660, the method 600 may optionally include including, for each measure in the semantic model, a computed property for each vertex in the vertex table, wherein the computed property can calculate the measure using the semantic model. For example, in an aspect, apparatus 500, processor 502, memory 504, and/or the graph model inference tool 130 may be configured to or may comprise means for including, for each measure 226 in the semantic model 160, a computed property 454 for each vertex in the vertex table. The computed property 454 can calculate the measure 226 using the semantic model 160. For example, the semantic model 160 may define a calculation for the measure 226 based on values for other columns in the source tables 152, and the graph model inference tool 130 may calculate a value for the computed property 454 by referencing the columns corresponding to the particular vertex (e.g., a row of the source table 152 corresponding to the vertex table).

At block 670, the method 600 may optionally include executing a graph query or a graph algorithm over an instance graph based on the graph model. For example, in an aspect, apparatus 500, processor 502, memory 504, the graph query engine 122 and/or the graph algorithm engine 124 may be configured to or may comprise means for executing a graph query or a graph algorithm over an instance graph based on the graph model. For example, the instance graph may be constructed as a graph index that references the source tables corresponding to the vertex tables and edge tables using numerical identifiers.

Figure 7:
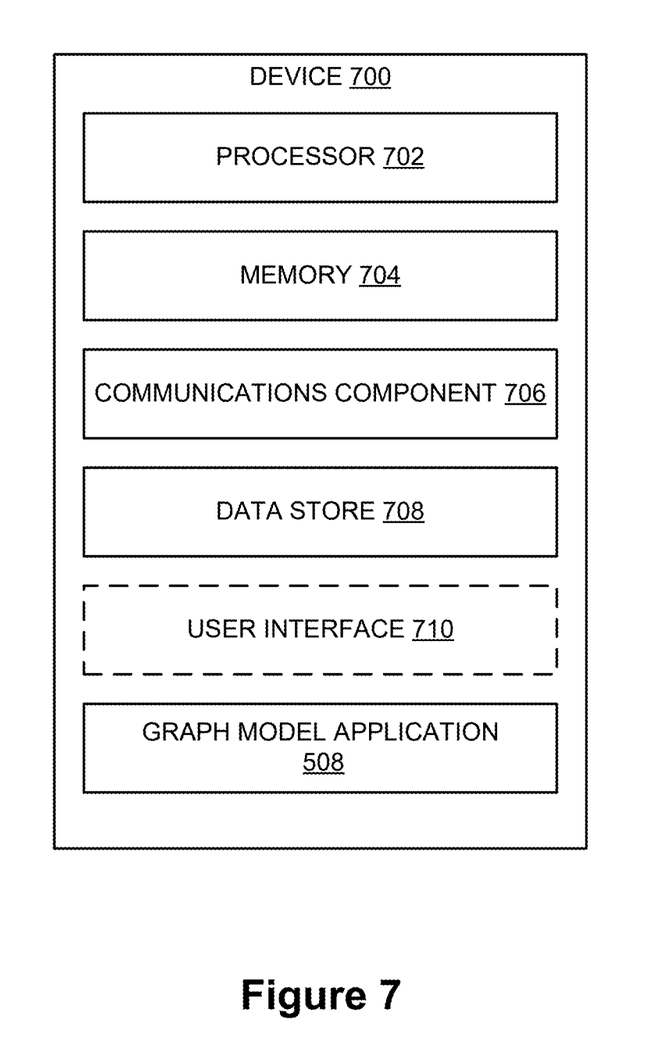
FIG. 7 illustrates an example of a device 700 including additional optional component details as those shown in FIG. 5.

FIG. 7 illustrates an example of a device 700 including additional optional component details as those shown in FIG. 5. In one aspect, device 700 includes processor 702, which may be similar to processor 702 for carrying out processing functions associated with one or more of components and functions described herein. Processor 702 can include a single or multiple set of processors or multi-core processors. Moreover, processor 702 can be implemented as an integrated processing system and/or a distributed processing system.

Device 700 further includes memory 704, which may be similar to memory 504 such as for storing local versions of operating systems (or components thereof) and/or applications being executed by processor 702, such as the graph model inference tool 130, key identifying component 132, vertex component 134, edge component 136, etc. Memory 704 can include a type of memory usable by a computer, such as random access memory (RAM), read only memory (ROM), tapes, magnetic discs, optical discs, volatile memory, non-volatile memory, and any combination thereof. The processor 702 may execute instructions stored on the memory 704 to cause the device 700 to perform the methods discussed above with respect to FIG. 6.

Further, device 700 includes a communications component 706 that provides for establishing and maintaining communications with one or more other devices, parties, entities, etc. utilizing hardware, software, and services as described herein. Communications component 706 carries communications between components on device 700, as well as between device 700 and external devices, such as devices located across a communications network and/or devices serially or locally connected to device 700. For example, communications component 706 may include one or more buses, and may further include transmit chain components and receive chain components associated with a wireless or wired transmitter and receiver, respectively, operable for interfacing with external devices.

Additionally, device 700 may include a data store 708, which can be any suitable combination of hardware and/or software, that provides for mass storage of information, databases, and programs employed in connection with aspects described herein. For example, data store 708 may be or may include a data repository for operating systems (or components thereof), applications, related parameters, etc. not currently being executed by processor 702. In addition, data store 708 may be a data repository for the graph model inference tool 130.

Device 700 may optionally include a user interface component 710 operable to receive inputs from a user of device 700 and further operable to generate outputs for presentation to the user. User interface component 710 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, a switch/button, any other mechanism capable of receiving an input from a user, or any combination thereof. Further, user interface component 710 may include one or more output devices, including but not limited to a display, a speaker, a haptic feedback mechanism, a printer, any other mechanism capable of presenting an output to a user, or any combination thereof.

Device 700 additionally includes the graph model inference tool 130 for inferring a graph model from a semantic model that describes source tables and relationships among the source tables.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more aspects, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media. Non-transitory computer-readable media excludes transitory signals.

The following numbered clauses provide an overview of aspects of the present disclosure:

Clause 1. An apparatus for inferring a graph model from a semantic model that describes source tables and relationships among the source tables, comprising: one or more memories; and one or more processors coupled with the memory and, individually or in combination, configured to identify at least one primary key for each relationship of a plurality of relationships defined in the semantic model based on whether the relationship is a m:1 relationship or a 1:1 relationship, each relationship defining at least one from-table and one to-table; create a vertex table in the graph model for each source table having a primary key, each vertex of the vertex table labeled with a name of a respective source table; create an edge table in the graph model for each from-table defined in a m:1 relationship of the semantic model; create an edge table in the graph model for one of the from-table or the to-table in a 1:1 relationship of the semantic model, each edge of the edge table is labeled with one or both of a source vertex table or a destination vertex table and a foreign-key column name that relates the source vertex table and the destination vertex table.

Clause 2. The apparatus of clause 1, wherein the at least one primary key for an m:1 relationship includes a to-column of the to-table that is referenced by a from-column of the at least one from-table.

Clause 3. The apparatus of clause 1 or 2, wherein the at least one primary key for a 1:1 relationship includes a to-column of the to-table or a from-column of the from-table.

Clause 4. The apparatus of clause 3, wherein the one or more processors, individually or in combination, are configured to select either the to-table or the from-table as a vertex table and the other of the to-table or the from-table as the edge table for the 1:1 relationship.

Clause 5. The apparatus of any of clauses 1-4, wherein columns of the source tables that are not used as keys in a vertex table or an edge table of the graph model are properties of a corresponding vertex table.

Clause 6. The apparatus of any of clauses 1-5, wherein the one or more processors, individually or in combination, are configured to, for each measure in the semantic model, include a computed property for each vertex in the vertex table, wherein the computed property can calculate the measure using the semantic model.

Clause 7. The apparatus of any of clauses 1-6, wherein a property set for each edge is empty except for a name of the edge table and properties linking the from-table and the to-table.

Clause 8. A method of inferring a graph model from a semantic model that describes source tables and relationships among the source tables, the method comprising: identifying at least one primary key for each relationship of a plurality of relationships defined in the semantic model based on whether the relationship is a m:1 relationship or a 1:1 relationship, each relationship defining at least one from-table and one to-table; creating a vertex table in the graph model for each source table having a primary key, each vertex of the vertex table labeled with a name of a respective source table; creating an edge table in the graph model for each from-table defined in a m:1 relationship of the semantic model; creating an edge table in the graph model for one of the from-table or the to-table in a 1:1 relationship of the semantic model, each edge of the edge table is labeled with one or both of a source vertex table or a destination vertex table and a foreign-key column name that relates the source vertex table and the destination vertex table.

Clause 9. The method of clause 8, wherein the at least one primary key for an m:1 relationship includes a to-column of the to-table that is referenced by a from-column of the at least one from-table.

Clause 10. The method of clause 8 or 9, wherein the at least one primary key for a 1:1 relationship includes a to-column of the to-table or a from-column of the from-table.

Clause 11. The method of clause 10, further comprising selecting either the to-table or the from-table as a vertex table and the other of the to-table or the from-table as the edge table for the 1:1 relationship.

Clause 12. The method of any of clauses 8-11, wherein columns of the source tables that are not used as keys in a vertex table or an edge table of the graph model are properties of a corresponding vertex table.

Clause 13. The method of any of clauses 8-12, further comprising, for each measure in the semantic model, including a computed property for each vertex in the vertex table, wherein the computed property can calculate the measure using the semantic model.

Clause 14. The method of any of clauses 8-13, wherein a property set for each edge is empty except for a name of the edge table and properties linking the from-table and the to-table.

Clause 15. A non-transitory computer-readable medium having computer-executable instructions stored thereon for inferring a graph model from a semantic model that describes source tables and relationships among the source tables, the instructions when executed by a computer processor cause the computer processor to:

identify at least one primary key for each relationship of a plurality of relationships defined in the semantic model based on whether the relationship is a m:1 relationship or a 1:1 relationship, each relationship defining at least one from-table and one to-table; create a vertex table in the graph model for each source table having a primary key, each vertex of the vertex table labeled with a name of a respective source table; create an edge table in the graph model for each from-table defined in a m:1 relationship of the semantic model; create an edge table in the graph model for one of the from-table or the to-table in a 1:1 relationship of the semantic model, each edge of the edge table is labeled with one or both of a source vertex table or a destination vertex table and a foreign-key column name that relates the source vertex table and the destination vertex table.

Clause 16. The non-transitory computer-readable medium of clause 15, wherein the at least one primary key for an m:1 relationship includes a to-column of the to-table that is referenced by a from-column of the at least one from-table.

Clause 17. The non-transitory computer-readable medium of clause 15 or 16, wherein the at least one primary key for a 1:1 relationship includes a to-column of the to-table or a from-column of the from-table.

Clause 18. The non-transitory computer-readable medium of clause 17, further comprising instructions to select either the to-table or the from-table as a vertex table and the other of the to-table or the from-table as the edge table for the 1:1 relationship.

Clause 19. The non-transitory computer-readable medium of any of clauses 15-18, wherein columns of the source tables that are not used as keys in a vertex table or an edge table of the graph model are properties of a corresponding vertex table.

Clause 20. The non-transitory computer-readable medium of any of clauses 15-19, further comprising instruction to, for each measure in the semantic model, include a computed property for each vertex in the vertex table, wherein the computed property can calculate the measure using the semantic model.

Clause 21. The non-transitory computer-readable medium of any of clauses 15-20, wherein a property set for each edge is empty except for a name of the edge table and properties linking the from-table and the to-table.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus for inferring a graph model from a semantic model that describes source tables and relationships among the source tables in a data lake, comprising:
    one or more memories; and
    one or more processors coupled with the one or more memories and, individually or in combination, configured to:
        identify at least one primary key for each relationship of a plurality of relationships defined in the semantic model based on whether said each relationship is a m:1 relationship or a 1:1 relationship, said each relationship defining at least one from-table and one to-table among the source tables in the data lake;
        create a vertex table in the graph model for each source table having a primary key, each vertex of the vertex table labeled with a name of a respective source table;
        create an edge table in the graph model for each from-table defined in a m:1 relationship of the semantic model;
        create an edge table in the graph model for one of the from-table or the to-table in a 1:1 relationship of the semantic model,
        each edge of the edge table is labeled with one or both of a source vertex table or a destination vertex table and a foreign-key column name that relates the source vertex table and the destination vertex table, wherein the graph model is built over underlying data in the data lake and includes pointers to locations of data in the data lake without copying the data into the vertex tables and edge tables of the graph model; and
        execute a graph query or a graph algorithm over an instance graph based on the graph model.

2. The apparatus of claim 1, wherein the at least one primary key for an m:1 relationship includes a to-column of the to-table that is referenced by a from-column of the at least one from-table.

3. The apparatus of claim 1, wherein the at least one primary key for a 1:1 relationship includes a to-column of the to-table or a from-column of the from-table.

4. The apparatus of claim 3, wherein the one or more processors, individually or in combination, are configured to select either the to-table or the from-table as a vertex table and the other of the to-table or the from-table as the edge table for the 1:1 relationship.

5. The apparatus of claim 1, wherein columns of the source tables that are not used as keys in a vertex table or an edge table of the graph model are properties of a corresponding vertex table.

6. The apparatus of claim 1, wherein the one or more processors, individually or in combination, are configured to, for each measure in the semantic model, include a computed property for each vertex in the vertex table, wherein the computed property can calculate the measure using the semantic model.

7. The apparatus of claim 1, wherein a property set for each edge is empty except for a name of the edge table and properties linking the from-table and the to-table.

8. A method of inferring a graph model from a semantic model that describes source tables and relationships among the source tables in a data lake, the method comprising:
    identifying at least one primary key for each relationship of a plurality of relationships defined in the semantic model based on whether said each relationship is a m:1 relationship or a 1:1 relationship, said each relationship defining at least one from-table and one to-table among the source tables in the data lake;

creating a vertex table in the graph model for each source table having a primary key, each vertex of the vertex table labeled with a name of a respective source table;

creating an edge table in the graph model for each from-table defined in a m:1 relationship of the semantic model;

creating an edge table in the graph model for one of the from-table or the to-table in a 1:1 relationship of the semantic model, each edge of the edge table is labeled with one or both of a source vertex table or a destination vertex table and a foreign-key column name that relates the source vertex table and the destination vertex table, wherein the graph model is built over underlying data in the data lake and includes pointers to locations of data in the data lake without copying the data into the vertex tables and edge tables of the graph model; and executing a graph query or a graph algorithm over an instance graph based on the graph model.

9. The method of claim 8, wherein the at least one primary key for an m:1 relationship includes a to-column of the to-table that is referenced by a from-column of the at least one from-table.

10. The method of claim 8, wherein the at least one primary key for a 1:1 relationship includes a to-column of the to-table or a from-column of the from-table.

11. The method of claim 10, further comprising selecting either the to-table or the from-table as a vertex table and the other of the to-table or the from-table as the edge table for the 1:1 relationship.

12. The method of claim 8, wherein columns of the source tables that are not used as keys in a vertex table or an edge table of the graph model are properties of a corresponding vertex table.

13. The method of claim 8, further comprising, for each measure in the semantic model, including a computed property for each vertex in the vertex table, wherein the computed property can calculate the measure using the semantic model.

14. The method of claim 8, wherein a property set for each edge is empty except for a name of the edge table and properties linking the from-table and the to-table.

15. A non-transitory computer-readable medium having computer-executable instructions stored thereon for inferring a graph model from a semantic model that describes source tables and relationships among the source tables in a data lake, the instructions when executed by a computer processor cause the computer processor to:

identify at least one primary key for each relationship of a plurality of relationships defined in the semantic model based on whether said each relationship is a m:1 relationship or a 1:1 relationship, said each relationship defining at least one from-table and one to-table among the source tables in the data lake;

create a vertex table in the graph model for each source table having a primary key, each vertex of the vertex table labeled with a name of a respective source table;

create an edge table in the graph model for each from-table defined in a m:1 relationship of the semantic model; and create an edge table in the graph model for one of the from-table or the to-table in a 1:1 relationship of the semantic model, each edge of the edge table is labeled with one or both of a source vertex table or a destination vertex table and a foreign-key column name that relates the source vertex table and the destination vertex table, wherein the graph model is built over underlying data in the data lake and includes pointers to locations of data in the data lake without copying the data into the vertex tables and edge tables of the graph model; and execute a graph query or a graph algorithm over an instance graph based on the graph model.

16. The non-transitory computer-readable medium of claim 15, wherein the at least one primary key for an m:1 relationship includes a to-column of the to-table that is referenced by a from-column of the at least one from-table.

17. The non-transitory computer-readable medium of claim 15, wherein the at least one primary key for a 1:1 relationship includes a to-column of the to-table or a from-column of the from-table.

18. The non-transitory computer-readable medium of claim 17, further comprising instructions to select either the to-table or the from-table as a vertex table and the other of the to-table or the from-table as the edge table for the 1:1 relationship.

19. The non-transitory computer-readable medium of claim 15, wherein columns of the source tables that are not used as keys in a vertex table or an edge table of the graph model are properties of a corresponding vertex table.

20. The non-transitory computer-readable medium of claim 15, further comprising instruction to, for each measure in the semantic model, include a computed property for each vertex in the vertex table, wherein the computed property can calculate the measure using the semantic model.

21. The non-transitory computer-readable medium of claim 15, wherein a property set for each edge is empty except for a name of the edge table and properties linking the from-table and the to-table.

* * * * *